United States Patent
Li et al.

(10) Patent No.: US 7,892,466 B2
(45) Date of Patent: Feb. 22, 2011

(54) OXYGEN TAILORING OF POLYETHYLENE RESINS

(75) Inventors: Dongming Li, Houston, TX (US); Ching-Tai Lue, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 1025 days.

(21) Appl. No.: 11/176,046

(22) Filed: Jul. 7, 2005

(65) Prior Publication Data
US 2006/0038312 A1  Feb. 23, 2006

Related U.S. Application Data

(60) Provisional application No. 60/602,906, filed on Aug. 19, 2004.

(51) Int. Cl.
*B27N 3/08* (2006.01)
*B29D 11/00* (2006.01)
*B29B 9/06* (2006.01)
*D01F 1/02* (2006.01)

(52) U.S. Cl. .................. 264/83; 264/1.6; 264/141; 264/211; 264/514; 264/564

(58) Field of Classification Search .............. None
See application file for complete search history.

(56) References Cited

U.S. PATENT DOCUMENTS

| | | | |
|---|---|---|---|
| 3,898,209 A | 8/1975 | Watson et al. | 528/481 |
| 4,029,877 A | 6/1977 | Yoshiura et al. | 528/483 |
| 4,115,107 A | 9/1978 | Booz et al. | 75/354 |
| 4,173,445 A | 11/1979 | McKelvey et al. | 425/382.4 |
| 4,302,565 A * | 11/1981 | Goeke et al. | 526/88 |
| 4,414,364 A | 11/1983 | McAlister | 525/437 |
| 4,528,151 A | 7/1985 | Matsuo et al. | 264/83 |
| 4,814,135 A | 3/1989 | Heitz | 264/564 |
| 4,890,996 A | 1/1990 | Shimizu | 425/145 |
| 5,032,562 A | 7/1991 | Lo et al. | 502/111 |
| 5,143,976 A | 9/1992 | Ashihara et al. | 525/227 |
| 5,284,613 A | 2/1994 | Ali et al. | 264/566 |
| 5,302,638 A | 4/1994 | Ho et al. | 524/59 |
| 5,338,589 A * | 8/1994 | Bohm et al. | 428/36.9 |
| 5,364,907 A | 11/1994 | Rolando et al. | 525/541 |
| 5,405,917 A | 4/1995 | Mueller, Jr. et al. | 525/333.8 |
| 5,420,220 A * | 5/1995 | Cheruvu et al. | 526/348.1 |
| 5,458,474 A | 10/1995 | Neubauer et al. | 425/202 |
| 5,525,678 A | 6/1996 | Mink et al. | 525/246 |
| 5,539,076 A | 7/1996 | Nowlin et al. | 526/481 |
| 5,578,682 A | 11/1996 | White | 525/282 |
| 5,587,434 A | 12/1996 | McCullough, Jr. et al. | 525/333.8 |
| 5,595,705 A * | 1/1997 | Walton et al. | 264/456 |

(Continued)

FOREIGN PATENT DOCUMENTS

EP          0180444          1/1990

(Continued)

*Primary Examiner*—Jeffrey Wollschlager

(57) ABSTRACT

Methods of tailoring polyethylenes are contemplated utilizing 0.5 to 70 volume percent oxygen containing gases. The tailoring occurs in a melt-conveying zone of a mixer/extruder, and not in the feed or melting zones of a mixer/extruder. The effect of tailoring is to decrease the haze and/or increase the gloss of blown films made from the tailored polyethylenes compared to similar polyethylenes that are extruded/mixed in the substantial absence of oxygen or oxygen containing gases.

10 Claims, 3 Drawing Sheets

U.S. PATENT DOCUMENTS

| | | | | |
|---|---|---|---|---|
| 5,728,335 | A * | 3/1998 | Neubauer | 264/83 |
| 5,739,266 | A | 4/1998 | Piana | 528/483 |
| 6,090,893 | A * | 7/2000 | Harlin et al. | 525/240 |
| 6,147,167 | A | 11/2000 | Mack et al. | |
| 6,207,756 | B1 | 3/2001 | Datta et al. | 525/191 |
| 6,248,840 | B1 | 6/2001 | Sukhadia et al. | |
| 6,444,605 | B1 | 9/2002 | Job et al. | 502/113 |
| 6,454,976 | B1 | 9/2002 | Neubauer | 264/85 |
| 6,713,004 | B2 | 3/2004 | Maekawa et al. | 264/102 |
| 6,984,698 | B2 * | 1/2006 | McLeod et al. | 525/333.8 |
| 6,987,148 | B2 | 1/2006 | Sodagudi et al. | 525/192 |
| 6,989,423 | B2 * | 1/2006 | Wagner et al. | 525/333.8 |
| 2002/0014717 | A1 | 2/2002 | Kling et al. | 264/171.27 |
| 2002/0091198 | A1 | 7/2002 | Itoh et al. | 525/192 |
| 2002/0143123 | A1 * | 10/2002 | Dekmezian et al. | 526/119 |
| 2003/0047831 | A1 | 3/2003 | Witt et al. | 264/142 |
| 2003/0055170 | A1 | 3/2003 | Guenther et al. | 525/192 |
| 2003/0055174 | A1 | 3/2003 | Tsutsui et al. | 525/240 |
| 2003/0154859 | A1 | 8/2003 | Simonaru et al. | 95/149 |
| 2003/0166774 | A1 | 9/2003 | Hoshi et al. | 525/88 |
| 2004/0023601 | A1 | 2/2004 | Mercuri | 451/51 |
| 2004/0039131 | A1 * | 2/2004 | Wagner et al. | 525/333.8 |
| 2004/0082722 | A1 | 4/2004 | McLeod et al. | 525/192 |
| 2005/0009942 | A1 | 1/2005 | Walton | 521/134 |
| 2005/0012235 | A1 | 1/2005 | Schregenberger et al. | 264/83 |
| 2006/0038315 | A1 | 2/2006 | Tunnell, III et al. | 264/210.3 |
| 2007/0043177 | A1 * | 2/2007 | Michie et al. | 526/65 |

FOREIGN PATENT DOCUMENTS

| | | |
|---|---|---|
| EP | 0457441 | 11/1991 |
| EP | 0728796 | 7/1999 |
| EP | 0936049 | 8/1999 |
| EP | 0729387 | 9/1999 |
| GB | 1201060 | 8/1970 |
| JP | H11-071427 | 3/1999 |
| JP | 2002-302514 | 10/2002 |
| WO | WO9609328 | 3/1996 |
| WO | WO 03/047839 | 6/2003 |
| WO | WO 2004/005357 | 1/2004 |
| WO | WO 2004/101674 | 11/2004 |

* cited by examiner

OXYGEN TAILORING OF POLYETHYLENE RESINS

CROSS-REFERENCE TO RELATED APPLICATION

The present application claims priority to Provisional U.S. Patent Application U.S. Ser. No. 60/602,906 filed Aug. 19, 2004 and is herein incorporated by reference.

TECHNICAL FIELD

Embodiments of our invention provide methods of oxygen tailoring polyethylene resins to improve the optical properties of films made from such resins.

BACKGROUND

Tailoring of resins, such as polyethylene homopolymer or copolymer resins is a known method of altering the molecular architecture and thus the bulk properties of the resin and articles made therefrom. Tailoring involves treating the polyethylene resin with an agent, such as a peroxide or oxygen, capable of controlled modification of the resin. The effect of tailoring on the polyethylene resin heretofore has been thought to exclusively influence Theological properties and may generally show an increase in the zero shear viscosity, an increase in elasticity (G'/G") and an increase in shear thinning behavior of the tailored pellets in comparison to the untailored (granular) product. These changes benefit the process of converting polyethylene pellets into final useful articles by reducing swell during the blow molding process, reducing sag during pipe extrusion, increasing the bubble stability, reducing gauge variation during film conversion.

In WO 03/047839, oxygen tailoring is suggested to increase shear thinning behavior, increase elasticity, increase melt tension, reduce swelling during blow molding, and increase bubble stability during film blowing. This document suggests that this is accomplished using 8 to 40% by volume oxygen in the melt conveying section of the extruder. There is no suggestion to an improvement in optical properties.

In U.S. Pat. No. 5,739,266, modifying a polyethylene in an extruder by bringing the polyethylene in contact oxygen or a gas mixture containing oxygen is suggested. This document suggests that the polymer is contacted with oxygen before it melts, and further suggests that the oxygen contact is performed before complete melting of the polymer. Additionally, this document suggests that the polymer-oxygen contact may occur in any part of the extruder, with the exception of the pumping or melt-conveying zone. The gas mixture suggested in this document contains from 1 to 50% by volume oxygen, when measured in the gas atmosphere of a feed hopper of the extruder. Again, there is no suggestion to an improvement in optical properties.

It would be commercially advantageous to have improved methods of tailoring polyethylene, particularly polyethylene film resin, to provide polyethylene resins having improved optical properties.

SUMMARY

We contemplate a process for producing a polyethylene film having improved optical properties, comprising: providing a polyethylene to a mixer/extruder; conveying the polyethylene through a mixer/extruder, the mixer/extruder comprising a melt-conveying zone, wherein in the melt-conveying zone the polyethylene is substantially melted; contacting the substantially melted polyethylene with a gas mixture comprising 0.5 to 70 volume % oxygen, to produce an oxygen-treated polyethylene, wherein the contacting occurs in the melt-conveying zone; and extruding the oxygen-treated polyethylene in to a film by a blown film process, wherein the film has a haze as measured by ASTM D1003 at least 10% lower than a comparable polyethylene mixed/extruded under similar conditions, in the substantial absence of oxygen.

Further, we contemplate a process for producing a polyethylene resin useful in blown film, the film having improved optical properties, comprising: introducing a granular polyethylene copolymer into a mixer/extruder; conveying the granular polyethylene through a feed zone, and/or a melting zone and a melt-conveying zone of the mixer/extruder; introducing a gas mixture to the melt-conveying zone, the melt-conveying zone comprising the gas mixture the polyethylene copolymer substantially melted, the gas mixture comprising in the range of 1% to 30% by volume oxygen, the remainder of the gas mixture comprising a non-reactive gas or a mixture of non-reactive gases, the gas mixture flowing in one of, a single port, a co-flow or a counter-flow to the direction of the substantially melted polyethylene copolymer in the melt-conveying zone, to form an oxygen treated polyethylene copolymer; processing the oxygen-treated polyethylene copolymer further by: forming into a film; or pelletizing and forming into a film; wherein the polyethylene copolymer comprises a density of 0.912 g/cm$^3$-0.930 g/cm$^3$, and haze, as measured by ASTM D1003, at least 40% lower than a comparable film made from a polyethylene copolymer mixed/extruded in the substantial absence of oxygen.

Further, we contemplate a process for producing a polyethylene having improved film properties when using a blown film process, comprising: introducing a granular polyethylene into a mixer/extruder; conveying the granular polyethylene through a feed zone, and/or a melting zone and a melt-conveying zone of the mixer/extruder; introducing a gas mixture to the melt-conveying zone, the melt-conveying zone consisting essentially of an extruder screw element and barrel, the gas mixture and the polyethylene, substantially melted; the gas mixture comprising in the range of 1% to 22% by volume oxygen, the remainder of the gas mixture comprising a non-reactive gas or a mixture of non-reactive gases, the gas mixture flowing in one of, a single port, a co-flow or a counter-flow to the direction of the substantially melted polyethylene in the melt-conveying zone, to form an oxygen treated polyethylene; processing the oxygen-treated polyethylene further by: pelletizing; or forming into a film; or pelletizing and forming into a film; wherein the polyethylene comprises a density of 0.912 g/cm$^3$-0.930 g/cm$^3$, and haze at least 50% lower and a gloss (MD) at least 100% higher than a comparable polyethylene mixed/extruded in the substantial absence of oxygen.

DESCRIPTION

Polyethylene Resin

Figure 1:
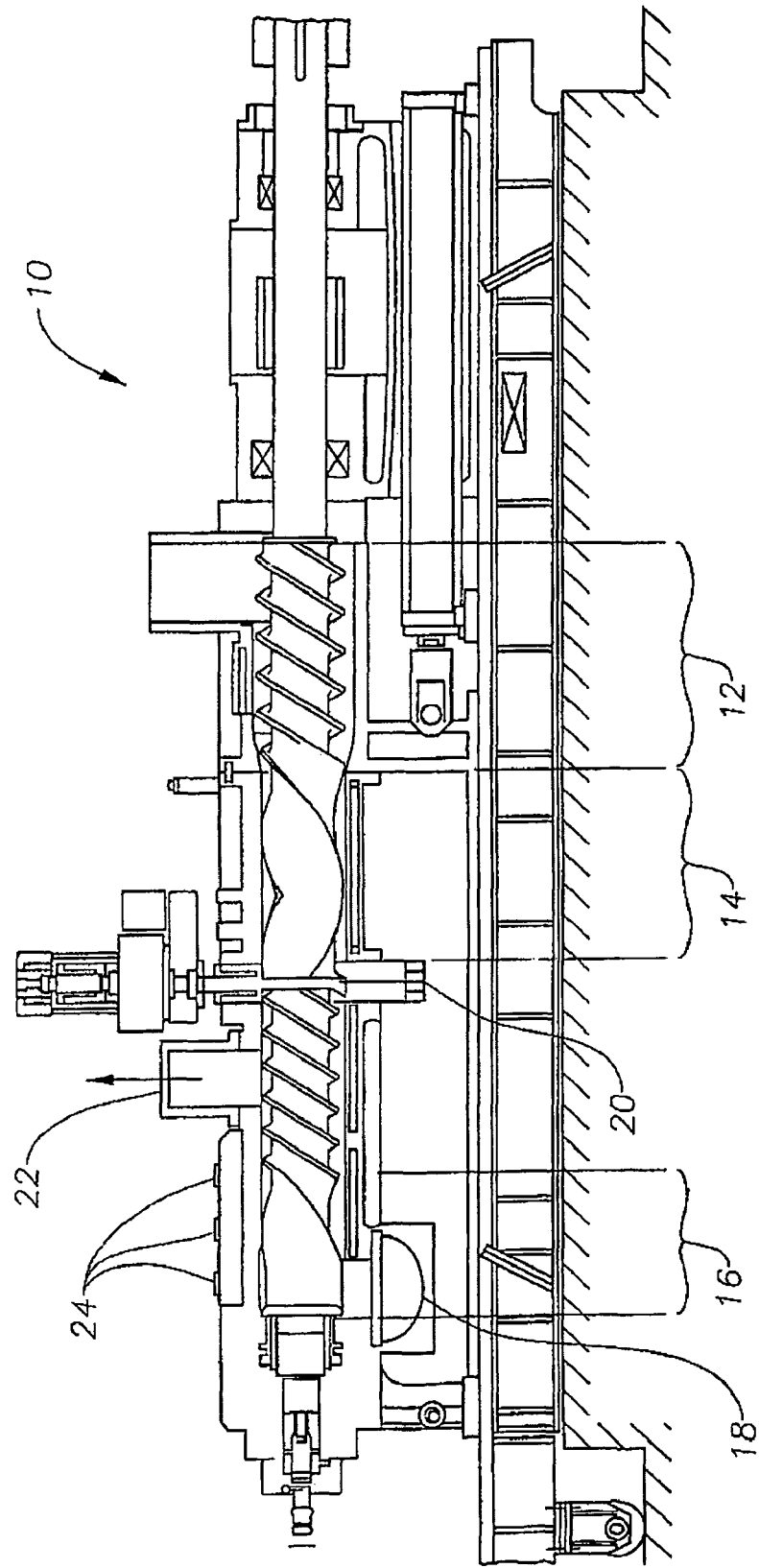
FIG. 1 is a schematic diagram of a Kobe mixer.

The polyethylene resins to be tailored in embodiments of our invention may comprise a polyethylene having a density from 0.910 g/cm$^3$-0.930 g/cm$^3$, or from 0.912 g/cm$^3$-0.930 g/cm$^3$, or from 0.915 g/cm$^3$-0.925 g/cm$^3$. The polyethylene can be a copolymer of ethylene and one or comonomers, with polymers having more than two types of comonomers, such as terpolymers, also included within the term "copolymer" as used herein. Suitable comonomers include α-olefins, such as $C_3$-$C_{20}$ α-olefins or $C_3$-$C_{12}$ α-olefins. The α-olefin comonomer can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary.

In another embodiment, the polyethylene resin has a multimodal or unimodal molecular weight distribution and/or a multimodal or unimodal composition distribution. The resin can be produced in conventional processes, such as single or tandem gas phase fluidized bed reactors, or single or tandem slurry loop or supercritical loop reactors, using any catalyst capable of producing multimodal resins. The catalyst used is not particularly limited, and can include, for example, one or more Ziegler-Natta catalysts and/or one or more metallocene catalysts. Mixtures of catalysts can also be used. In particular, polymerization can be carried out with two or more different catalysts present and actively polymerizing at the same time, in a single reactor. The two or more catalysts can be of different catalyst types, such as a non-metallocene catalyst and a metallocene catalyst, to produce a polyethylene resin having desirable properties. The catalysts can be fed to the reactor separately or as a physical mixture, or each catalyst particle can contain more than one catalyst compound. When the catalysts include two catalysts producing polymers of different molecular weight and/or different comonomer content, the polymer product can have a multimodal distribution of molecular weight, comonomer, or both. Such multimodal products can have physical properties that are different from those that can be obtained from either catalyst alone, or from post-reactor mixing of the individual unimodal resins obtained from each catalyst alone.

For example, U.S. Pat. No. 5,525,678 discloses a catalyst including a zirconium metallocene that produces a relatively low molecular weight, high comonomer-content polymer, and a titanium non-metallocene that produces a relatively high molecular weight, low comonomer-content polymer. Typically, ethylene is the primary monomer, and small amounts of hexene or other alpha-olefins are added to lower the density of the polyethylene. The zirconium catalyst incorporates most of the comonomer and hydrogen, so that, in a typical example, about 85% of the hexene and 92% of the hydrogen are in the low molecular weight polymer. Water is added to control the overall molecular weight by controlling the activity of the zirconium catalyst.

Other examples of suitable catalysts include Zr/Ti catalysts disclosed in U.S. Pat. No. 4,554,265; mixed chromium catalysts disclosed in U.S. Pat. Nos. 5,155,079 and 5,198,399; Zr/V and Ti/V catalysts disclosed in U.S. Pat. Nos. 5,395,540 and 5,405,817; the hafnium/bulky ligand metallocene mixed catalysts disclosed in U.S. Pat. No. 6,271,323; and the mixed metallocene catalysts disclosed in U.S. Pat. No. 6,207,606.

Also contemplated are physical blends of at least two polyethylenes, each of which may be produced in one or more reactors, which when put together have a multimodal molecular weight distribution and/or a multimodal composition distribution.

Any of the polyethylene resins discussed herein can be the product of only one catalyst or any combination of polyolefin catalysts. The types of catalysts include any one or more transition metal catalysts composed in part of elements from groups III, IV, V, VI, VII, VIII, IX, X, XI and XII on the periodic table. Examples of some of these catalysts include metallocene catalysts based on Zirconium and Hafnium as well as traditional catalysts based Magnesium. Chromium, Titanium and Vanadium.

Mixer-Extruder

The polyethylene resin may be processed in a mixer, such as a co- or counter-rotating, intermeshing or non-intermeshing twin screw mixer or an extruder. Such mixers are well-known in the art, and are commercially available from various sources, such as Coperion (Werner-Pfleiderer), Kobelco and Farrel. The resin is usually fed, by means of a hopper, to the feeding zone of the mixer, in this zone the temperature is generally below the melting temperature of the resin as the resin is compressed and conveyed toward the melting zone. Typically, the temperature in the feeding zone is 20 to 100° C., and may be maintained by cooling the extruder walls. In the melting zone, the temperature is increased to at least partially melt the resin, or alternatively, substantially all of the resin. In the melt conveying zone, the temperature is sufficient to maintain the substantially melted resin in a melted state. By "substantially all", we intend here that greater than 95 wt. % or greater than 97 wt. %, or greater than 99 wt. %, or 100% of the polyethylene is melted. Each zone may only be partially filled with the resin; by partially filled we intend 10-99% of the volume of any zone or zones are filled to such percentages by resin and any additives. Although the terms "mixer" and "extruder" are often used loosely and interchangeably, one skilled in the art will appreciate that mixers, such as the commercially available Kobe or Farrel mixers, operate at relatively low pressures, typically about 100 psi or less, and the zones within the mixer are generally not completely filled with resin. In extruders, such as are commercially available from, for example, Werner-Pfleiderer, operations may be at higher pressures in at least some zones, depending on modular screw/barrel design for that zone and the percentage of the zone that is filled with the resin and/or resin and additives, and the some of the various zones within the extruder may be generally completely filled with resin, and such zones will be generally at higher pressures.

Although not limited to any particular mixer, an embodiment of the process of the invention is illustrated now by reference to FIG. 1, showing a schematic diagram of a Kobe mixer 10. Mixer 10 includes a feed zone 12, a melting zone 14, and a melt-conveying zone 16. Resin and optional additives are provided to mixer 10 in the feed zone 12, and the resin is conveyed in a downstream direction through the melting zone 14 and the melt-conveying zone 16. Gate 20 separates the melting zone 14 from the melt-conveying zone 16. An optional vent 22 is shown in FIG. 1 in the melt-conveying zone 16. As described above, the resin is generally at least partially melted in melting zone 14, and generally, substantially completely melted in melt-conveying zone 16. The resin is conveyed through the mixer discharge 18 and further processed, such as by pelletizing.

Figure 2:
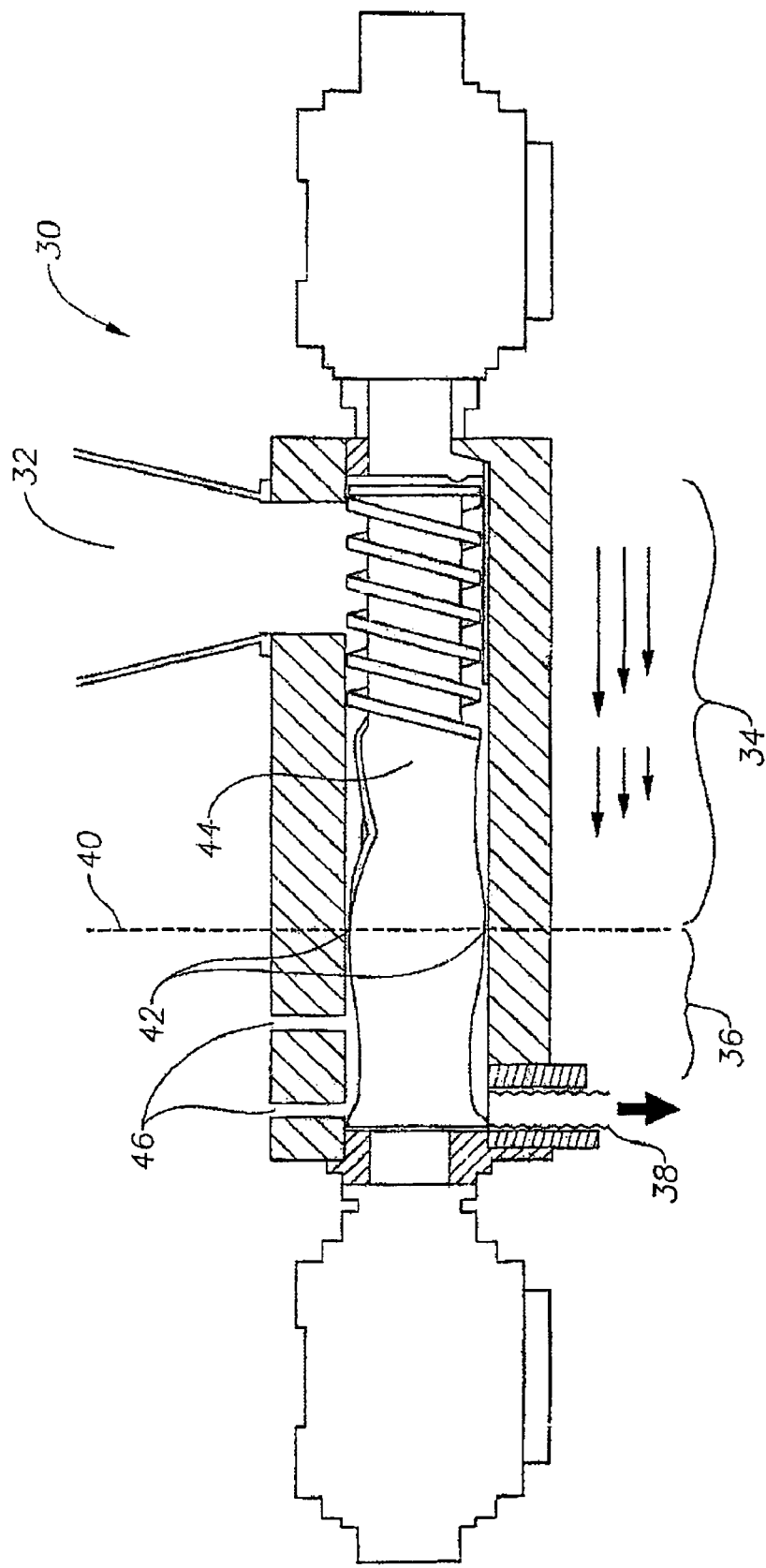
FIG. 2 is a schematic diagram of a Farrel mixer.

Turning now to FIG. 2, reference is made to a Farrel mixer 30. Mixer 30 includes a feed zone 32, a melting zone 34, and a melt-conveying zone 36. Resin and optional additives are provided to mixer 30 in the feed zone 32, and the resin is conveyed in a downstream direction through the melting zone 34 and the melt-conveying zone 36. As described above, the resin is generally at least partially melted in melting zone 34, and generally, substantially completely melted in melt-conveying zone 36. The resin is conveyed through the mixer discharge 38 and further processed, such as by pelletizing. The Farrel mixer does not have a gate such as gate 20 of the Kobe mixer separating the melting zone from the melt-conveying zone. However, melting zone 34 and melt-conveying zone 36 are effectively separated by a narrow clearance region shown by dashed line 40 corresponding to the apex 42 of mixing element 44. An optional dam (not shown) can be inserted between melting zone 34 and melt-conveying zone 36 at the position of line 40.

Figure 3:
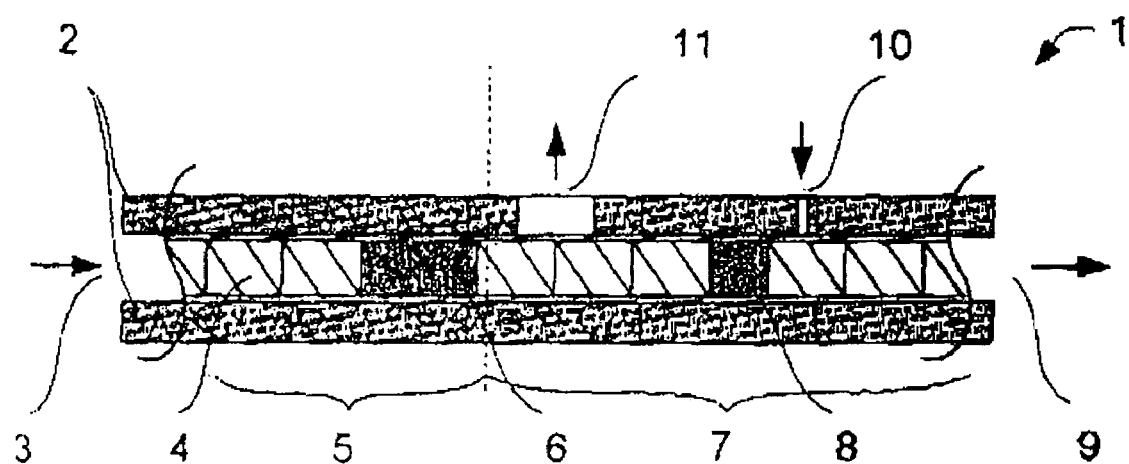
FIG. 3 is a schematic diagram of a Werner-Pfleiderer mixer-extruder.

Turning now to FIG. 3, reference is made to a Werner-Pfleiderer extruder where the cross section (1) comprises a barrel or barrels (2), and screw or screws (4) made up of modular elements. Resin (polyethylene) in either granule or pellet form, and optional additives are fed to the processing section (1) and conveyed from the feed end (3) to discharge end (9) with a melting zone created by kneading and reverse conveying elements of the screw (4), the processing section is divided into a melting zone and a melt-conveying zone (7). The resin (polyethylene) is contacted with oxygen containing gas in the melt-conveying zone only, by either the open vent port (11) or injecting oxygen containing gas stream from injecting port (10), in this latter case the gas stream (10) will flow upstream against or counter to the melted polyethylene being conveyed from left to right, in which case the gas mixture exits at open vent port (11). Alternatively, the injecting port (10) can be placed upstream to the vent port (11), the gas mixture is injected in the injecting port (10), co-flows with molten resin, and exits from vent port (11). The practical effect of either gas flow model is longer residence/contact time than simple contact at a vent port. Additionally, special elements (8) can be placed between (10) and (11) to increase interface generation for oxygen contact and increase local residence time of the melt. The gas can also contact the molten resin via a single port, where both entry and exit of the gas takes place from the same port. More than one "single port" may be used.

The resin can be processed at melt temperature of from a lower limit of 200° F. (104° C.), or 240° F. (116° C.), or 260° F. (127° C.), or 280° F. (138° C.,) or 300° F. (149° C.), or 350° F. (176° C.), or 400° F. (204° C.) to an upper limit of less than 536° F. (280° C.), or 518° F. (270° C.), or 500° F. (260° C.), or 430° F. (221° C.) or less than 420° F. (216° C.) or less than 410° F. (210° C.) or less than 400° F. (204° C.), where the melt temperature is the temperature at the downstream end of the melting zone. The melt temperature as used herein is the temperature of the melted polymer/polyethylene. Once such a polymer/polyethylene has transitioned from a solid, non-melted state, the temperature of the melted polymer/polyethylene can continue to rise. No matter the actual temperature, the melt temperature is understood to be the temperature of the polymer/polyethylene at least at its melting point, and above. For example, in FIG. 1, the melt temperature is the temperature at gate 20, in FIG. 2, the melt temperature is the temperature at the apex 42 and in FIG. 3 the melt temperature is the temperature at the discharge end (9) of the processing section after the last barrel section.

It should be appreciated that mixers and/or extruders other than those named and illustrated herein can be used, as long as the mixer or extruder has a melt conveying zone that will allow the introduction of oxygen or an oxygen mix.

Oxygen-Gas Mixture

The resin is contacted with oxygen or an oxygen-gas mix in the melt-conveying zone. The oxygen or an oxygen-gas mix may be provided, for example, through one or more gas inlet ports. Referring to FIG. 1, for example, in some embodiments, oxygen or an oxygen-gas mix can be provided through one or more inlets 24. Referring to FIG. 2, for example, in some embodiments, oxygen or an oxygen-gas mix can be provided through one or more inlets 46. Referring to FIG. 3, for example, in some embodiments, oxygen or an oxygen mix can be provided through one or more inlets as noted above. It should be appreciated that these specific inlet positions are merely exemplary. In embodiments of our invention the feed hopper and/or the feed zone and/or the melting zone are substantially free of intentionally added oxygen or an oxygen-gas mix. By substantially free, we intend less than 2% by volume, or less than 1% by volume Oxygen or an oxygen-gas mix can be provided at a continuous flow of gas or, alternatively, oxygen can be provided intermittently. In an embodiment, the gas stream may be injected into the extruder/mixer barrel at a location upstream to a vent port. The gas may counter-flow with the molten polyethylene resin, or the gas may co-flow with the molten polyethylene. By oxygen, we intend oxygen, peroxides, or other reactive tailoring agents. While we discuss embodiments using oxygen or oxygen mixtures as the tailoring agent, other tailoring agents may also be used such as peroxides and/or other free radical initiators. Azo-compounds that can be used as free radical initiators are: 2,2'-Azo(2,4-dimethylpentanentrile) [Vazo® 52]; 2,2'-Azobisisobutyronitrile [Vazo64];2,2'-Azobis-(2-methylbutyronitrile) [Vazo® 67] and 1,1'-Azocyclohexanecarbonitrile [Vazo® 88], each available from E. I. Dupont. Additional free radical initiators include lauroyl peroxide; benzoyl peroxide; cyclohexanone peroxide; 1,1-Bis(tert-butylperoxy)-3,3,5-trimethylcyclohexane; tert-butylperoxy isopropyl carbonate; tert-butyl peracetate; 2,2-bis(tert-butylperoxy)butane; tert-butyl peroxybenzoate bis(1-(tert-butylperoxy)-1-methylethylcyclohexane; dicumyl peroxide 2,5-Bis(tert-butylperoxy)-2,5-dimethyl-3-hexyne; tert-butyl peroxide; 2,4-pentaneedione peroxide; and cumene hydroperoxide.

Oxygen gas can be provided as an essentially pure gas or as part of a gas mixture. The oxygen can be provided in a pre-mixed gas mixture, or co-fed to the extruder with a diluent gas, adjusting the amount of oxygen in the resulting mixture by adjusting relative oxygen/diluent gas flow rates. For example, oxygen and nitrogen can be fed to the extruder at separately metered flow rates to provide oxygen to the extruder at the desired concentration. Oxygen content of the gas stream may be varied to control the level of tailoring or effect upon the polyethylene resin. The oxygen level in the gas stream may be in the range of from 0.1 to 7.9 volume %, or 0.25 to 7.5, or 0.5 to 7.0, or 0.75 to 6.5, or 1.0 to 6.0, or 1.5 to 5.5, or 2.0 to 5.0, or 2.5 to 4.75, or 2.75 to 4.5, or 3 to 4 volume percent.

In another embodiment the oxygen level may range from 0.1 to 70 volume %. This includes a lower limit of 0.5, or 1, or 2, or 4, or 5 or 7 or 9, or 10, or 15 or an upper limit of 70, or 60, or 50, or 40, or 30, or 25, or 22, or 21, or 20, or 15, or 10, or 7.9, or 6, or 5, or 4 volume %.

The remainder of the gas mixture may be any non-flammable gas or gas mixture, such as nitrogen, argon, helium, neon, krypton, xenon, carbon dioxide, or mixtures thereof. After the oxygen treatment, or "tailoring", the resin can be extruded through a die and pelletized and cooled, or can be directly extruded without pelletization to form a film, such as by a cast or blown film process.

Various additives can also be introduced into the extruder, as is conventional in the art.

Tailoring

Tailoring is the result of a chemical reaction between the tailoring agent, such as oxygen or oxygen containing agents such as peroxides, and the polymer. The tailoring, in one embodiment may be measured by increases in elasticity, may be affected by one or more of temperature of the polymer, residence time of the contact of the tailoring agent (such as oxygen) with the polymer, the concentration of the tailoring agent and the concentration or residence time of anti-tailoring agents such as antioxidants and/or other stabilizing additives. In the case of tailoring agents like oxygen, where the relative solubility of oxygen in the polymer melt compared to the gas is low, most of the tailoring reaction occurs along the interface, so increasing the surface area of the interface can increase the extent of the tailoring. Any of these aforementioned variables may also be used to control the tailoring process.

In another embodiment, tailoring may be measured by decreases in haze or increases in gloss, or both.

After exposure to oxygen, the polyethylene may comprise a haze at least 10 or 20 or 30 or 40 or 50% less than the same polyethylene extruded/mixed under similar conditions but in the substantial absence of oxygen contact (also indicated as non-tailored).

After exposure to oxygen, the polyethylene may comprise a gloss at least 20, or 30, or 40, or 50, or 60, or 70, or 80, or 90, or 100, or 110, or 120, or 130, or 140, or 150% greater than the same polyethylene extruded/mixed under similar conditions but in the substantial absence of oxygen contact (also indicated as non-tailored).

By similar conditions we intend that the extrusion rates, extruder zone temperatures, screw design and other parameters are generally the same, save for normal process fluctuations. By non-tailored we mean a granular polyolefin mixed or extruded in such a way that the modification of its rheology and or optical properties is minimized. This minimization may be accomplished by excluding tailoring agents from the granular resin being extruded/mixed, and/or extruding/mixing the polyolefin with a non-reactive gas or gas mixture such as nitrogen and/or extruding/mixing the polyolefin with a high concentration of primary and/or secondary antioxidants and/or extruding/mixing the polyolefin at relatively low melt temperatures below, for instance, 200° C. Or non-tailored means extruded/mixed in the substantial absence of oxygen or an oxygen mixture, or in a nitrogen or non-reactive gas atmosphere. By the substantial absence of oxygen, we intend that less than 1, or less than 0.5, or less than 0.25, or less than 0.1, or less than 0.05, percent by volume oxygen, or oxygen containing gas such as air, are present in a given process or segment of a process.

In the case of optical properties we also intend that factors known to affect optical propertied are also substantially the same when comparison of tailored and non-tailored resins or films are made, such as die and or air ring temperature, cooling air temperature. In cast films these would further include the same or similar temperatures of chill roll.

Tailoring can be influenced by additives such as anti-oxidants and/or anti-ozonants such as phosphites and/or phosphonites. Generally, the more of such additives present in the polymer, the lower the amount and effect of tailoring for a given temperature, oxygen content and/or residence time. Such additives may be present in the polyethylene resin at a lower level from 0, or 2, or 5, or 10, or 20, or 30, or 40 parts per million (ppm) based on the polyethylene resin, other additives and any optional fillers, to an upper limit of 3000, or 2500, or 2000, or 1500, or 1000, or 750, or 500, or 400, or 300, or 200, or 100 ppm.

Other particular embodiments of the invention include a process for producing a polyethylene resin useful in blown film, the film having improved optical properties, comprising:
  a) introducing a granular polyethylene copolymer into a mixer/extruder;
  b) conveying the granular polyethylene through a feed zone, and/or a melting zone and a melt-conveying zone of the mixer/extruder;
  c) introducing a gas mixture to the melt-conveying zone, the melt-conveying zone comprising the gas mixture the polyethylene copolymer substantially melted, the gas mixture comprising in the range of 1% to 30% by volume oxygen, the remainder of the gas mixture comprising a non-reactive gas or a mixture of non-reactive gases, the gas mixture flowing in one of, a single port, a co-flow or a counter-flow to the direction of the substantially melted polyethylene copolymer in the melt-conveying zone, to form an oxygen treated polyethylene copolymer;
  d) processing the oxygen-treated polyethylene copolymer further by: i) forming into a film; or ii) pelletizing and forming into a film; wherein the polyethylene copolymer comprises a density of $0.912$ $g/cm^3$-$0.930$ $g/cm^3$, and haze, as measured by ASTM D1003, at least 40% lower than a comparable film made from a polyethylene copolymer mixed/extruded in the substantial absence of oxygen.

Yet another embodiment of the invention is to a process for producing a polyethylene having improved film properties when using a blown film process, comprising:
  a) introducing a granular polyethylene into a mixer/extruder;
  b) conveying the granular polyethylene through a feed zone, and/or a melting zone and a melt-conveying zone of the mixer/extruder;
  c) introducing a gas mixture to the melt-conveying zone, the melt-conveying zone consisting essentially of an extruder screw element and barrel, the gas mixture and the polyethylene, substantially melted; the gas mixture comprising in the range of 1% to 22% by volume oxygen, the remainder of the gas mixture comprising a non-reactive gas or a mixture of non-reactive gases, the gas mixture flowing in one of, a single port, a co-flow or a counter-flow to the direction of the substantially melted polyethylene in the melt-conveying zone, to form an oxygen treated polyethylene;
  d) processing the oxygen-treated polyethylene further by: i) pelletizing; or ii) forming into a film; or iii) pelletizing and forming into a film; wherein the polyethylene comprises a density of $0.912$ $g/cm^3$-$0.930$ $g/cm^3$, and haze at least 50% lower and a gloss (MD) at least 100% higher than a comparable polyethylene mixed/extruded in the substantial absence of oxygen.

EXAMPLES

Film gauge was measured according to ASTM D374-94 Method C.

Film gauge variation was determined using a Measuretech Series 200 instrument. This instrument measures film thickness using a capacitance gauge. For each film sample, ten film thickness datapoints are measured per inch of film as the film is passed through the gauge in a transverse direction. Three film samples were used to determine the gauge variation. The gauge variation was determined by dividing the full range of film thickness (maximum minus minimum) by the average thickness, and dividing the result by two. The gauge variation is presented as a percentage change around the average.

Dart Drop Impact values were measured using the procedures in ASTM D1709-98 Method A, except that the film gauge was measured according to ASTM D374-94 Method C.

Elmendorf Tear strength (machine direction, "MD", and transverse direction, "TD") were measured using the procedures in ASTM D1922-94a, except that the film gauge was measured according to ASTM D374-94 Method C.

The term "Melt Index" refers to the melt flow rate of the resin measured according to ASTM D-1238, condition E (190° C., 2.16 kg load), and is conventionally designated as $I_{2.16}$. The term "Flow Index" refers to the melt flow rate of the resin measure according to ASTM D-1238, condition F (190° C., 21.6 kg load), and is conventionally designated as $I_{21.6}$. Melt index and flow index have units of g/10 min, or equivalently dg/min. The term "MFR" refers to the ratio $I_{21.6}/I_{2.16}$, and is dimensionless.

Specific Energy Input (SEI) refers to the energy input to the main drive of the extruder, per unit weight of melt processed resin, and is expressed in units of hp·hr/lb or kW·hr/kg.

"Elasticity" as used herein is the ratio of G' to G" at a frequency of $0.1\ s^{-1}$, where G' and G" are the storage (or elastic) and loss (or viscous) moduli, respectively. G' and G" were measured according to ASTM D-4440-84. Measurements were made at 200° C. using a Rheometrics DSR500 dynamic stress oscillatory rheometer equipped with 25 mm parallel plates and an approximate 1.5 mm gap.

Density ($g/cm^3$) was determined using chips cut from plaques compression molded in accordance with ASTM D-1928-96 Procedure C, aged in accordance with ASTM D618 Procedure A, and measured according to ASTM D1505-96.

The percent haze measurement is carried out according to ASTM test method D1003, which measures the transmitted light that, in passing through the specimen, deviates from the incident beam by forward scattering. For the purposes of this test method, only light flux deviating more than 2.5° on the average is considered to be haze.

Gloss of films is measured by BYK Gardner Micro-Gloss 45° Reflectometer according to ASTM D 2457.

Oxygen was provided to an oxygen-nitrogen gas mixture. The oxygen level was controlled by varying the relative flows of oxygen and nitrogen. The oxygen level reported in the data tables was calculated from the volumetric flow rates of air and nitrogen.

Example A

The equipment used to tailor polyethylenes as noted, was a Coperion (Werner-Pfleiderer) ZSK-57 co-rotating twin screw extruder. The schematic diagram is FIG. 3, and the Figure shows the processing section of the machine (1). This processing section comprises barrels (2) and screws (4) made up of modular elements. The resin, Exceed® 1018CA (Available from ExxonMobil Chemical Company, Houston, Tex.), either in granule or pellet form, is a nominal 1.0 g/10 min. melt index, 0.918 $g/cm^3$ density resin, formulated with 500 ppm of Irganox®-1076 (both available from Ciba Specialty Chemicals, Basel Switzerland) and 2000 ppm of Weston 399 (available from GE Specialty Chemicals) and 800 ppm Dynamar® FX5920 (available from 3M Company) were fed into the processing section (1) and conveyed from the feed end (3) to discharge end (9). The processing section is divided into a melting zone (5), created by kneading and reverse-conveying screw elements, and a melt-conveying zone.

The resin was contacted with oxygen in the melt-conveying zone, by either injecting oxygen, an oxygen mixture or nitrogen (as shown in table 1) in the open vent port (11) or more effectively injecting oxygen or an oxygen mixture from injecting port (10). In the latter case, the gas stream flows upstream against the melt-conveying of the melted resin, then the gas stream escapes from the open port (11). Further, neutral kneading elements were placed between (10) and (11) to increase interface generation for oxygen contact and increase the local residence time of the melted resin.

Oxygen content in the gas stream was from ambient air or about 21% of the gas mixture.

To produce a blown film the following polyethylenes (noted in Table I below) were extruded into a film on a 2.5" Gloucester extruder with a 4" die at 60 mil die gap a 2.5 blow up ratio (BUR), a frost line height of about 25 inches and the film produced had a nominal thickness of 1 mil.

For reference, commercial Exceed 1018CA was used.

TABLE I

| Description | Haze (%) | Gloss | | Elmendorf Tear (g/mil) | |
|---|---|---|---|---|---|
| | | MD | TD | MD | TD |
| Exceed 1018CA lot A | 19.8 | 36.7 | 36.7 | 268 | 418 |
| Exceed 1018CA lot B | 33.7 | 20.3 | 20.4 | 230 | 392 |
| Exceed 1018CA lot A Compounded under N2 | 20.3 | 39.7 | 39.3 | 275 | 678 |
| Exceed 1018CA lot A Compounded under air | 10.8 | 51 | 51.7 | 255 | 445 |

| Description | Dart drop (g/mil) | 1% Secant modulus (psi) | | Tensile Strength (psi) | | Tensile elongation at break (%) | |
|---|---|---|---|---|---|---|---|
| | | MD | TD | MD | TD | MD | TD |
| Exceed 1018CA lot A | 532 | 25740 | 29120 | 9967 | 8745 | 514 | 645 |
| Exceed 1018CA lot B | 647 | 25300 | 28330 | 10430 | 8470 | 522 | 645 |
| Exceed 1018CA lot A Compounded under N$_2$ | 558 | 26700 | 30250 | 9400 | 7560 | 493 | 621 |
| Exceed 1018CA lot A Compounded under air | 522 | 26680 | 30500 | 9540 | 8990 | 506 | 663 |

The first two films samples were commercial Exceed1018CA converted into blown film as received. No further compounding involved. Film on line 3 was Exceed 1018CA lot A compounded on ZSK-57 under Nitrogen then converted into blown film. Film on line 4 was Exceed 1018CA lot A compounded on ZSK-57 under air then converted into blown film.

We claim:

1. A process for producing a polyethylene film having improved optical properties, comprising:
    a) providing a mixer/extruder, wherein the mixer/extruder comprises a feed zone, a melt-conveying zone, and an optional melting zone;
    b) providing a polyethylene to the feed zone of the mixer/extruder, wherein the polyethylene consists essentially of unimodal polyethylene and has a density of from 0.915 g/cm$^3$ to 0.925 g/cm$^3$, and wherein the feed zone and the optional melting zone are substantially free of intentionally added oxygen such that the feed zone and the optional melting zone contain less than 1 volume % of intentionally added oxygen;
    c) conveying the polyethylene through the mixer/extruder, wherein in the melt-conveying zone the polyethylene is substantially melted;
    d) contacting the substantially melted polyethylene with a gas mixture comprising 1.0 to 70 volume % oxygen, to produce an oxygen-treated polyethylene, wherein the contacting occurs in the melt-conveying zone; and
    e) extruding the oxygen-treated polyethylene into a film by a blown film process, wherein the film has a haze as measured by ASTM D 1003 at least 10% lower than a film made from the same polyethylene mixed/extruded under the same conditions except that the polyethylene is mixed/extruded in the substantial absence of oxygen.

2. The process of claim 1, wherein the gas mixture comprises a lower limit of one of 1.5%, or 2.0%, or 2.5%, or 2.75%, or 3.0% by volume oxygen and/or an upper limit of one of 70%, or 60%, or 50%, or 40%, or 30, or 22, by volume oxygen.

3. The process of claim 1, wherein the gas mixture is introduced to the melt-conveying zone in one of a single port, a counter flow or a co-flow with the substantially melted polyethylene.

4. The process of claim 3, wherein the polyethylene comprises ethylene and one or more of propylene; 1-butene; 3-methyl-1-butene; 3,3-dimethyl-1-butene; 1-pentene; 1-pentene with one or more methyl, ethyl or propyl substituents; 1-hexene; 1-hexene with one or more methyl, ethyl or propyl substituents; 1-heptene; 1-heptene with one or more methyl, ethyl or propyl substituents; 1-octene; 1-octene with one or more methyl, ethyl or propyl substituents; 1-nonene; 1-nonene with one or more methyl, ethyl or propyl substituents; ethyl, methyl or dimethyl-substituted 1-decene; 1-dodecene; or styrene.

5. The process of claim 4, wherein the polyethylene film has a haze of at least 20, or 30, or 40, or 50% lower than a film made from the same polyethylene mixed/extruded under the same conditions except that the polyethylene is mixed/extruded in the substantial absence of oxygen.

6. The process of claim 4, wherein the polyethylene film has a gloss (MD) as measured by BYK Gardner Micro-Gloss 45° Reflectometer according to ASTM D 2457, of at least 20, or 30, or 40, or 50, or 60, or 70, or 80, or 90, or 100, or 110, or 120, or 130, or 140, or 150% greater than a film made from the same polyethylene mixed/extruded under the same conditions except that the polyethylene is mixed/extruded in the substantial absence of oxygen.

7. The process of claim 1, wherein the substantially melted polyethylene is contacted with the gas mixture in a portion of the mixer/extruder consisting essentially of the melt-conveying zone.

8. The process of claim 1, further comprises pelletizing the oxygen treated polyethylene prior to extruding into a blown film.

9. A process for producing a polyethylene resin useful in blown film, the film having improved optical properties, comprising:
    a) introducing a granular polyethylene copolymer into a mixer/extruder, wherein the polyethylene copolymer consists essentially of unimodal polyethylene and comprises a density of 0.915 g/cm$^3$ to 0.925 g/cm$^3$;
    b) conveying the granular polyethylene through a feed zone, a melting zone, and a melt-conveying zone of the mixer/extruder, wherein the feed zone and the melting zone are substantially free of intentionally added oxygen such that the feed zone and the melting zone contain less than 1 volume % of intentionally added oxygen;
    c) introducing a gas mixture to the melt-conveying zone, the melt-conveying zone comprising the gas mixture and the polyethylene copolymer substantially melted, the gas mixture comprising in the range of 1% to 30% by volume oxygen, the remainder of the gas mixture comprising a non-reactive gas or a mixture of non-reactive gases, the gas mixture flowing in one of, a single port, a co-flow or a counter-flow to the direction of the substantially melted polyethylene copolymer in the melt-conveying zone, to form an oxygen treated polyethylene copolymer;
    d) processing the oxygen-treated polyethylene copolymer further by:
        i) forming into a film; or
        ii) pelletizing and forming into a film;
wherein the film has a haze, as measured by ASTM D1003, at least 40% lower than a film made from the same polyethylene copolymer mixed/extruded under the same conditions except that the polyethylene is mixed/extruded in the substantial absence of oxygen.

10. A process for producing a polyethylene having improved film properties when using a blown film process, comprising:
    a) introducing a granular polyethylene into a mixer/extruder, wherein the polyethylene consists essentially of unimodal polyethylene and comprises a density of 0.915 g/cm$^3$ to 0.925 g/cm$^3$;
    b) conveying the granular polyethylene through a feed zone, a melting zone, and a melt-conveying zone of the mixer/extruder, wherein the feed zone and the melting zone are substantially free of intentionally added oxygen such that the feed zone and the melting zone contain less than 1 volume % of intentionally added oxygen;
    c) introducing a gas mixture to the melt-conveying zone, the melt-conveying zone consisting essentially of an extruder screw element and barrel, the gas mixture and the polyethylene, substantially melted; the gas mixture comprising in the range of 1% to 22% by volume oxygen, the remainder of the gas mixture comprising a non-reactive gas or a mixture of non-reactive gases, the gas mixture flowing in one of, a single port, a co-flow or a counter-flow to the direction of the substantially melted polyethylene in the melt-conveying zone, to form an oxygen treated polyethylene ;
d) processing the oxygen-treated polyethylene further by:
  i) pelletizing; or
  ii) forming into a film; or
  iii) pelletizing and forming into a film;

wherein the film has a haze at least 50% lower and a gloss (MD) at least 100% higher than a film made from the same polyethylene mixed/extruded under the same conditions except that the polyethylene is mixed/extruded in the substantial absence of oxygen.

* * * * *